United States Patent [19]

Walters

[11] Patent Number: 4,676,227

[45] Date of Patent: Jun. 30, 1987

[54] SOLAR PANEL

[76] Inventor: Lonnie D. Walters, 7641 Blossomview Ct., Dayton, Ohio 45424

[21] Appl. No.: 834,409

[22] Filed: Feb. 28, 1986

[51] Int. Cl.[4] .................................................. F24J 2/56
[52] U.S. Cl. ...................................... 126/450; 126/442
[58] Field of Search ............... 126/444, 442, 419, 448, 126/450, 416, 422

[56] References Cited

U.S. PATENT DOCUMENTS

| | | | |
|---|---|---|---|
| 2,608,968 | 9/1952 | Moseley | 126/442 |
| 3,299,881 | 1/1967 | Koch | 126/416 |
| 4,014,314 | 3/1977 | Newton | 126/426 |
| 4,083,358 | 4/1978 | Scott | 126/448 |
| 4,513,731 | 4/1985 | Campbell | 126/440 |

FOREIGN PATENT DOCUMENTS

| | | | |
|---|---|---|---|
| 909092 | 4/1946 | France | 126/422 |
| 942345 | 2/1949 | France | 126/442 |
| 2394033 | 2/1979 | France | 126/442 |
| 18239 | 2/1977 | Japan | 126/442 |
| 142154 | 8/1983 | Japan | 126/419 |

Primary Examiner—James C. Yeung
Attorney, Agent, or Firm—Jerome P. Bloom

[57] ABSTRACT

A solar panel comprising a generally cylindrically shaped sealed housing which is hollow and defines therein a relatively shallow generally cylindrical chamber one end of which is bounded by an impervious base and the opposite end of which is bounded by a disc of baked solar glass, an intermediate portion of a length of seamless heat conductive tubing coiled within said chamber in a substantially concentric spaced relation to the peripherally bounding wall thereof, said coil being formed to provide therein successive loops thereof which are substantially concentrically arranged and radially spaced to produce within said chamber a substantially extended flow path for passage therethrough of fluids, the respective positions of said loops and said disc of solar glass providing that they are disposed in a plurality of planes which are essentially parallel, the respective end portions of said length of tubing being disposed exterior to said housing for the coupling of said tubing into a related system to which the solar panel is intended to apply.

13 Claims, 7 Drawing Figures

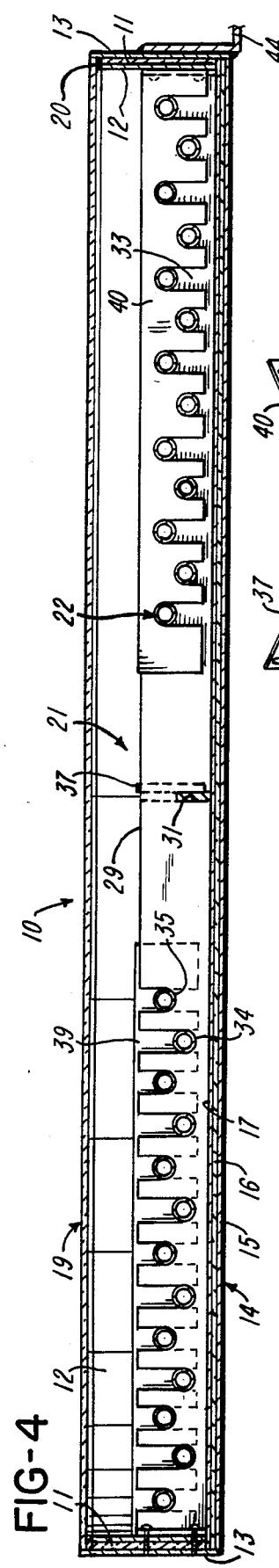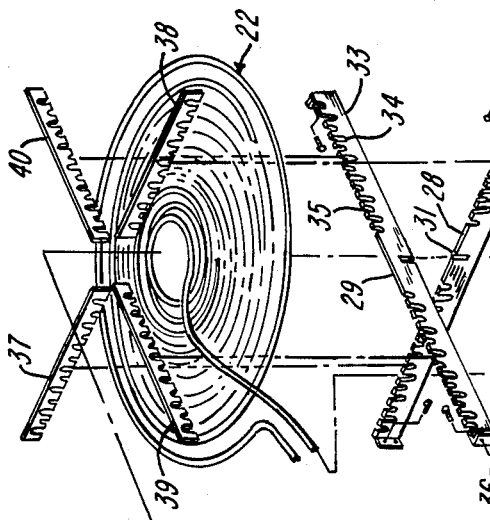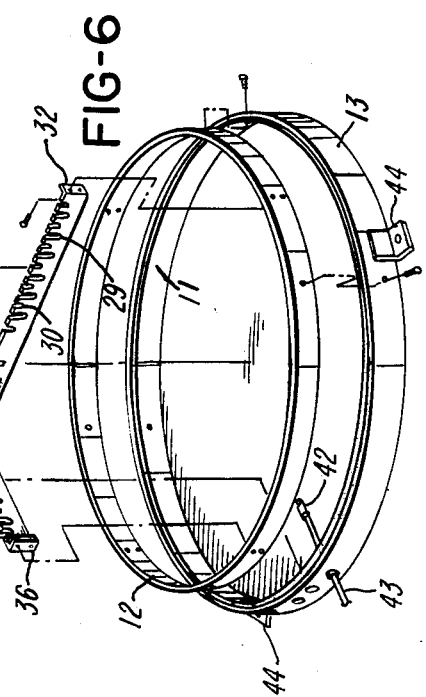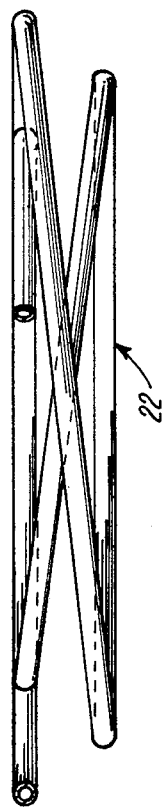

SOLAR PANEL

BACKGROUND OF THE INVENTION

This invention relates to heat exchangers and more particularly to a new and improved solar panel and systems thereof. Embodiments are especially advantageous for use in application to residential and commercial buildings as a means to most effectively capture heat emanating from the sun and apply such heat to a flow therethrough of fluid from a source of supply, which fluid, so heated, may then be cycled therefrom and used to favorably condition and/or supplement conventional heating facilities within the related building or to actually heat interior portions of the building or means therein. The invention will be described in this context. It is to be understood, however, that such is only by way of example and not by way of limitation.

While widely touted as a source of heat and energy for a home or commercial building, solar panels heretofore known have generally proven to be relatively inefficient devices plagued by many problems in their use. For these and other reasons, having little to do with climatic conditions, they have had relatively little public acceptance.

A typical solar panel of the prior art comprises a generally rectangular housing containing a number of short lengths of tubing joined by various coupling devices to form therein a generally rectangular heat exchanger through which heat from the sun is transmitted to liquid, hopefully to raise its temperature sufficiently that on discharge from the panel the temperature of the so heated liquid may be consistently high enough to effectively serve a useful purpose over a long period of time. In a large number of instances such panels have not shown the degree of effectiveness and efficiency required to justify the cost of their installation and maintenance. Their heating capacity, for a given size, has been less than desirable, a problem one source of which is their basic design which imposes shadowing characteristics in their interior. Further, they exhibit on many occasions the development of leakage, which not only breaks down the required pattern of their function but further reduces the heat receiving, storing and transfer capacity thereof. This is apart from the frequent inspection and maintenance they require in use thereof. All this and other problems are solved by the present invention.

To the extent of his knowledge, the present inventor is not aware of any other pertinent development in the prior art.

SUMMARY OF THE INVENTION

The present invention enables solar panels and systems thereof which are simple to fabricate, safer, efficient and more satisfactory in use, adaptable to a wide variety of applications, relatively maintenance free and unlikely to malfunction.

A typically preferred embodiment of a solar panel per the present invention comprises a generally cylindrically shaped sealed housing which is hollow to define therein a relatively shallow generally cylindrical chamber one end of which is bounded by its impervious base and the opposite end of which is bounded by a disc of baked solar glass. Coiled within said chamber in a substantially concentric spaced relation to the peripherally bounding wall thereof is a continuous coil of seamless tubing the successive loops of which are substantially concentrically arranged, radially spaced and successively offset from each other in a direction axially of the housing intermediate the radially outermost and the radially innermost limit of the coil. The arrangement of the coil and the respective loops thereof present them in different planes with reference to the plane of the solar glass at the outer end of the housing, thereby to maximize the exposure of each of the loops and minimize the shadowing thereof in the course of the sun moving over the solar glass and reaching the interior of said chamber during any given day. The respective end portions of the length of tubing from which said continuous coil is formed are respectively extended radially outward from the inner and outer limits of the coil and through a pair of openings in the housing which are spaced, a seal being defined thereabout in each case as they exit from said housing.

Particularly preferred embodiments of the invention feature means which set the respective loops of the coil of tubing in precisely those positions which will maximize their capture of heat from the sun to which the solar glass portion of the housing may be exposed.

The housing of embodiments is insulated and the form and substance thereof is such to make it and its contents safe and highly resistant to damage or distortion in handling or by reason of violent weather or the consequences thereof.

In a broad context an embodiment of the present invention features a continuous joint-free length of heat conductive seamless tubing, preferably of copper, an intermediate portion of the length of which is coiled on itself within an insulated, preferably quite shallow, housing one side of which is defined by a plate of solar glass through which said coil is exposed to the passing sun, the loops of said coil being successively offset with reference to each other and successively offset with respect to the solar glass and thereby achieving a substantially maximized exposure to and capture of the heat of the sun passing over the solar glass, and the respective end portions of the tubing being projected outwardly of said housing for the connection thereof to the system the panel is required to service.

The panels of the invention may be easily and effectively established in series relation and even interconnected to provide for a recirculating movement of fluid through series related coils of a length of continuous seamless tubing disposed in series related panels.

A primary object of the invention is to provide a new and improved mode of construction of a solar panel which renders such devices more efficient and satisfactory in use.

Another object is to provide a solar panel which is simply constructed utilizing a heat exchanger comprised of a continuous length of heat conductive seamless tubing coiled on itself intermediate its ends, the coiled portion of which is disposed within a sealed housing one side of which is comprised of solar glass. A further object is to provide such a solar panel wherein the coiled portion of said length of seamless tubing is formed in substantially concentric loops which are radially spaced and successively offset from each other and with reference to said solar glass side portion of said housing. An additional object is to provide apparatus corresponding to the last described solar panel wherein means are provided to maintain set positions of said loops with respect to each other and with respect to said housing.

Another object is to provide is to provide a solar panel which is relatively maintenance free.

A further object is to provide a relatively large amount of exposed heat transfer surface within a solar panel of a given size, as compared to that heretofore provided in such apparatus.

A further object is to provide solar panels and systems thereof possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

REFERRING TO THE DRAWINGS,

FIG. 4 is a sectional view taken along line 4—4 of FIG. 3;

FIG. 4A is an enlarged section of the upper left hand corner of the view shown in FIG. 4

FIG. 5 is a side elevation view of a portion of the coil of the heat conductive tubing provided in the housing of the solar panel, shown partly in section and demonstrating the relatively offset nature of successively adjacent loop portions of said coil per the embodiment of the invention illustrated; and FIG. 6 is an exploded view of the illustrated panel.

Figure 1:
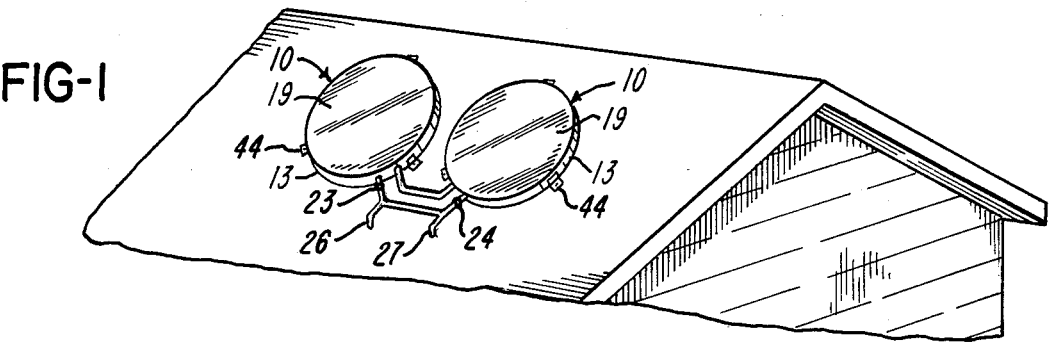
FIG. 1 illustrates, in perspective, a solar panel per the present invention shown in a system thereof installed on a roof of a residential building.
Figure 2:
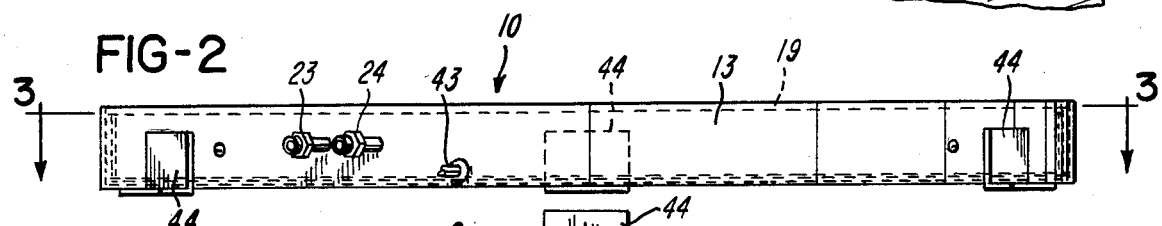
FIG. 2 is a side elevation view of the solar panel of FIG. 1.

With particular reference to the drawings throughout which like parts are similarly numbered, the exemplary embodiment of the invention reveals a solar panel 10 comprising a generally cylindrically shaped sealed housing which is hollow and defines therein a relatively shallow generally cylindrical chamber the lower end of which is bounded by a disc shaped base plate 15. The depth of this housing is relatively shallow and the axial length of its outer peripheral surface is defined by a ring 13. The ring 13 mounts perpendicular to and has the lower or base end of its shallow cylindrical form in abutment with the peripherally outermost portion of the upper surface of the plate 15, welded thereto and thereby integrated therewith.

The ring 13, which is formed on a uniform radius and circular in cross-section, and its base plate 15, are fabricated of a material, preferably steel, rendering them rigid and highly resistant to distortion, damage, detorization or destruction by by reason of extremes in weather or otherwise.

A sheet 16 of an insulating material such as asbestos or its equivalent is superposed on and coextensive with the inner surface of the base plate 15 and in a bridging relation to the inner surface of the bounding lower extremity of the ring 13. A layer 11 of the same insulating material is applied in lining relation to the inner surface of the ring 13 from the outer peripheral edge portion of the sheet 16 to a point immediately adjacent and spaced from its upper extremity. Seated on, over and coextensive with the sheet 16 and peripherally abutting the inner surface of the lower end portion of the insulating layer 11 is a disc 17 of aluminum the uppermost surface of which is coated with a heat retention black material, preferably one having the characteristics of a paint. Lining the inner surface of the layer 11 is a ring 12 formed of the same material as the disc 17 and similarly coated. The ring 12 has a cylindrical configuration the axial extent of which rises from and perpendicular to the inner or upper surface of the disc 17 and is suitably fixed thereto at its base, immediately inward of the insulating layer 11, and has its upper extremity co-planar with the upper limit of the insulating layer 11, both of which are abutted by an overlying ring seal 20.

The outer and inner rings 13 and 15 are suitably clamped together by radially directed fastening devices which for purposes of this disclosure are shown in the drawings as screws, in the process of which to sandwich the intervening layered insulating material therebetween. At the same time the layered insulating material 16 is correspondingly sandwiched between the base plates 15 and 17.

The end of the housing of the solar panel 10 remote from its base is completed by the insertion within and in bridging relation to the upper end of the ring 13 of a disc 19 of baked, tinted solar glass. In the application thereof the outer peripheral edge of the glass 19 fits tightly to the bounding inner surface portion of the ring 13 and a seal and a fixed relation is provided therebetween by use of a suitable adhesive. At the same time the outer peripheral portion of the inner surface of the plate 19 seats to the seal 20 and forms therewith a seal of the upper end of the chamber defined in said housing. See FIGS. 4 and 4A in this respect.

Figure 3:
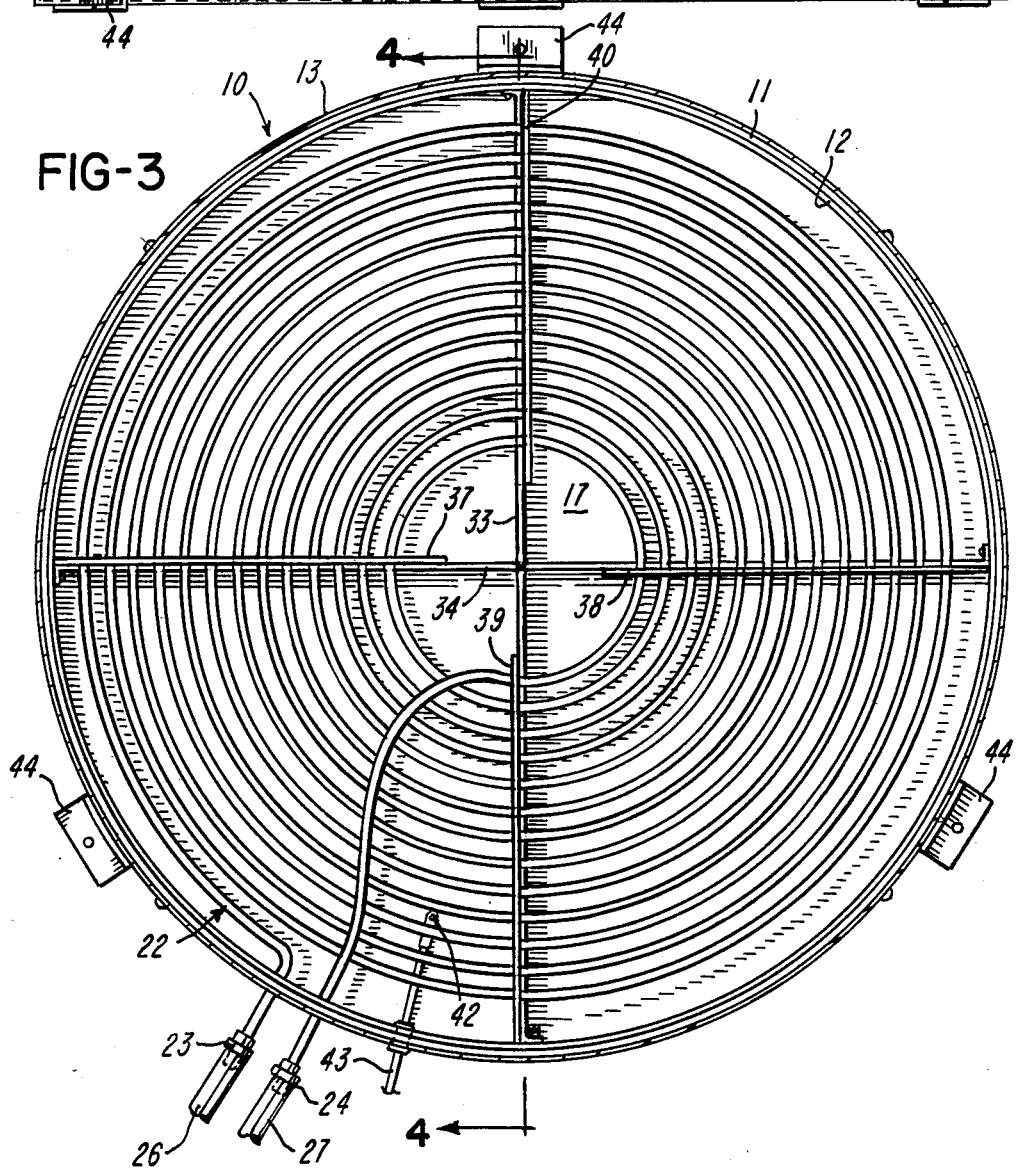
FIG. 3 is a top plan view of the solar panel unit the solar glass of which has been removed for clarity of its interior detail.

Within said chamber, in a substantially concentric spaced relation to the peripherally bounding wall thereof, is an intermediate portion of the length of continuously seamless tubing which is formed in a continuous coil 22. The successive loops of this coil are substantially concentrically arranged, radially spaced and successively offset from each other in a direction axially of the housing, intermediate the radially outermost and the radially innermost limits of the coil. The arrangement of the coil and the respective loops thereof present the loops in different planes with reference to the plane of the solar glass at the outer end of the housing, thereby to maximize the exposure of each of the loops and minimize the shadowing thereof in the course of the sun moving over the solar glass and reaching the interior of said chamber during any given day. The respective end portions of the length of tubing from which said continuous coil is formed are respectively extended substantially radially outward from the inner and outer limits of the coil and through a pair of openings in the housing which are spaced, a seal being defined thereabout in each case as they exit from said housing. The outwardly disposed ends of the tubing are shown in FIG. 3 to be provided respectively with conventional adapters 23 and 24 for the respective coupling thereto of a source of fluid to be heated in passing through the coil 22 and a discharge line for carrying from the coil to its intended place of use that fluid which has already been heated within the solar panel.

As mentioned previously, preferred embodiments of the invention feature means which set the respective loops of the coil of tubing 22 in precisely those positions which will maximize their capture of heat from the sun to which the solar glass portion of the housing may be exposed. In the embodiment illustrated in detail in FIGS. 3, 4 and 6 such means comprise a lower support structure formed of two intersecting flat bars 29 which in the assembly thereof are edge mounted to project perpendicular to the base plate 17 in an arrangement where they diametrically bridge the bridge this plate at right angles to one another. The assembly of the bars 29 is enabled by providing in each thereof, at its center, a notch, the notch in one being formed inwardly of its lower edge and perpendicular thereto while the other bar has a complementary notch directed inwardly of its upper edge. As will be obvious from FIG. 6, the nature of this assembly is such that it corresponds to that utilized in an egg crate construction. The respective bars 29 each have right angled tabs 32 and 36 respectively which abut the inner wall surface of the ring 12 and are suitably secured thereto to lock the bars in place.

Particular note is to be taken of the successive notches provided in identical fashion along the length of each of the bars 29, in its upper edge, there being an identical longitudinally spaced series thereof to either side and spaced from a central portion of the length of each bar. As will be seen from FIG. 4, in cross section, the successive notches 34 and 35 in each half of the length of each bar, moving from adjacent the outer peripheral limit radially inward thereof, are successively different in depth and directed axially of the chamber in which the bars are fixed. Since the notches in each half of each bar are identically spaced and have an identical pattern of offset, they provide for the respectively successive loops of the coil 22, so designed, to fall respectively in a series of circularly spaced appropriately provided notches as the coil 22 is mounted in the the shallow cylindrical chamber of the housing of the solar panel 10 prior to the application of the solar glass 19. The bottoms of the notches 34, 35 are complementary to the lower halves of the cross-section of the portion of the loops of the coil which are seated therein. Following this the loops are locked in place in their required concentrically spaced offset relation by a series of clamping upper bars 37, 38, 39 and 40 (FIGS. 4 and 6) each having a series of notches cut inwardly of its lower edge formed to mate with the notches in one half the length of a bar 29 as it is brought down over the portions of the loops of the coil 22 respectively nested therein. The upper bars thus cap and contact the upper halves of the nested portions of the loops to fix them in place. Once each of the bars 37, 38, 39 and 40 are applied, they are welded in face abutting relation to the bars 29. A compact secured relation of the coil 22 with the loops thereof successively offset is so arranged to minimize the possible shadowing of any significant portion thereof when the sun passes over the glass 19 is thereby achieved.

Particular attention is directed to the fact, observable with reference to FIG. 4, that in the form of the coil 22 and the respective dispositions of the loops thereof the major portions of the loops are so offset as to divide their positioning into essentially two planes which are generally parallel to each other and to the plane of the glass 19. The arrangement of the loops in any case absolutely minimizes the interference of one portion of the heat exchanger here provided from another, clearly solving one of the problems in the use of prior art solar panel devices applied to similar purpose.

As particularly seen and demonstrated in FIG. 4, not only are the loops of coil 22 so arranged as to be immediately adjacent, radially spaced and differentially offset but also so spaced from and related to each other as to avoid shadowing of one by the other. In the preferred embodiment illustrated they are also immediately of and more closely adjacent the disc 17 than the solar glass disc 19 as well as differentially spaced therefrom. Note further that there is a repetitive pattern of the differential offset of these loops from the inner to the outer radial limit of the coil 22, and vice versa, which resultingly dictates that the loops dispose in a plurality of immediately adjacent levels (in this instance two) between the disc 17 and the solar glass 19. Moreover, each level is occupied and defined by a distinct portion of the loops of which the coil 22 is comprised. This structure is not only compact but as seen from the drawings the coil and its loops as so arranged and spaced from the bounding walls of the solar panel are insured an optimal environment within which to achieve their intended function with maximum efficiency.

Thus, at one time there is provided an ability of the coil 22 to capture and directly transfer to a fluid which flows therethrough an amount of heat on a given day which is significantly increased over the potential for this in a similar sized unit the form of which is exemplified by the prior art. At the same time the provision for the flow conducting tubing within the solar panel being continuous and continuously seamless not only eliminates the problems of leaks in the solar panel which result in the rapid deterioration but also it inherently results in an ability to provide a substantially greater amount of tubing and heat transfer surface thereof to have simultaneous exposure thereof to the heat emanating from the sun. This facility is contributed to significantly by the provision of the shape of the solar panel housing to provide therein a cylindrical chamber.

In addition thereto, the housing of embodiments is so constructed and insulated and the form and substance thereof is such to make it and its contents safe and highly resistant to damage or distortion in its handling or by reason of violent weather or the consequences thereof. The important benefits resulting should be quite obvious.

As pointed out previously, in a preferred embodiment thereof, the present invention features a continuous joint-free length of heat conductive seamless tubing, preferably of copper, an intermediate portion of the length of which is coiled on itself within an insulated, preferably quite shallow, housing one side of which is defined by a plate of solar glass through which said coil is exposed to the passing sun, the loops of said coil being successively offset with reference to each other and successively offset with respect to the solar glass thereby to achieve a substantially maximized potential of simultaneous exposure of said loops to capture the heat of the sun passing over the solar glass.

The panels of the invention may be easily and effectively established in series relation and even interconnected to provide for a recirculating movement of fluid through series related coils of a length of continuous seamless tubing disposed in series related panels. The latter is particularly seen from the schematic arrangement shown in FIG. 1 wherein the continuously seamless tubing providing the coil 22 in the first panel, as described, is extended into the solar chamber of the second panel 10, in series relation, within which a second coil 22 may be provided in the portion of the tubing therein with a similar repeated mode of capture of additional heat from the sun. Thus, the amount of the heat added to a given flow may be significantly amplified and with recycling as indicated there can be a continuing build up of heat in a given portion of the flow of fluid the temperature of which is intended to be raised. The import of this is of considerably importance. Of course suitable external controls may be interrelated with the fluid flowing to and from the solar panel(s). In the present illustration there is in fact an indication of a sensor 42, 43. However, the details thereof do not in and of themselves merit illustration and discussion since in and of themselves they are not essential to a complete disclosure of the solar panels and systems thereof enabled by the present invention.

Of course, the previous remarks hereinbefore set forth must all be considered in connection with the substance and importance of the significant contribution to the art provided by the present invention.

From the above description it will be apparent that there is thus provided a device of the character described possessing the particular features of advantage before enumerated as desirable, which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A solar panel comprising a generally cylindrically shaped sealed housing which is hollow and defines therein a relatively shallow generally cylindrical chamber one end of which is bounded by a surface portion of an impervious base and the opposite end of which is bounded by a disc of baked solar glass, an intermediate portion of a length of seamless heat conductive tubing coiled within said chamber in a substantially concentric spaced relation to the peripherally bounding wall thereof and in a spaced facing relation to each of said base surface and said solar glass, said coil being formed in successive loops which are substantially concentrically arranged and radially spaced to produce within said chamber a substantially extended flow path for passage therethrough of fluids, said loops being arranged in an axially displaced but closely adjacent relation to provide thereby that said loops are disposed in a plurality of planes which are relatively closely adjacent and essentially parallel and each occupied by a plurality of said loops, the respective end portions of said length of tubing being disposed exterior to said housing for the coupling of said tubing into a related system to which the solar panel is intended to apply.

2. Apparatus as in claim 1 wherein said loops of said coil are successively offset from each other in a direction axially of said chamber, intermediate the radially outermost and the radially innermost limit of the coil.

3. Apparatus as in claim 1 wherein said housing comprises a receptable for said coil and a cap constituted by said disc of solar glass, said receptable portion of said housing is comprised of means including an outer shell of steel and means defining an inner shell having the capacity to capture heat of the sun as and when exposed thereto and said inner and outer shells are interconnected to form a unitary structure with an intervening layer of insulation sandwiched therebetween.

4. A solar panel as in claim 1 arranged in series relation to at least one other such panel wherein the said coils within each thereof, provided by a length of continuous seamless tubing, provide interconnected coils in respectively adjacent panels in which successive increments of heat may be applied to fluids passing through said tubing, in the course of their simultaneous exposure to heat of the sun passing over the solar glass portions of said panels, prior to the discharge of such fluid to the point of the intended use of the heat which the fluid has thereby acquired.

5. Apparatus as in claim 4 wherein means providing said interconnection of said series related coils are constructed to include a recirculation line between said coils to enable further enhancement of the temperature of such fluid as is passed through said coils within said panels prior to its delivery to its intended place of use.

6. A solar panel including a housing defining a solar chamber comprising a side wall, a back wall forming its base and a wall opposite and back wall formed at least in part by solar glass, a coil of continuous tubing within and in spaced relation to said side wall, said coil being formed in substantially concentric loops, said loops being successively differentially offset to form immediately adjacent levels of said loops between and spaced from said base and said solar glass, each of said levels being occupied by a plurality of said loops which are substantially concentrically arranged and said loops being differentially and radially spaced in a manner to substantially inhibit overshadowing of one thereof by another and to maximize exposure of each thereof at such time that sun may pass across said solar glass.

7. A solar panel as in claim 6 characterized in that there are two of said immediately adjacent levels, a portion of said loops are disposed substantially in one of said levels and the remainder of said loops are disposed substantially in the other of said two levels.

8. A solar panel as in claim 6 characterized in that said loops are more closely adjacent said base than said solar glass.

9. A solar panel as in claim 6 characterized by means which fix said loops in said differentially offset relation thereof.

10. A solar panel as in claim 6 wherein said loops in said respective levels thereof are fixed with reference to said housing between overlapping retention devices.

11. A solar panel as in claim 6 wherein said side wall of said housing has a generally cylindrical shape one end of which is sealingly capped by said base and the other substantially by said solar glass, said housing, in an axial direction, is shallow, means are applied to fix the positions of said loops within and spaced from interior surface portions of said solar glass and said housing and the interior of said housing is otherwise substantially free of interference with and provides means to reinforce the inherent ability of said loops to substantially fully capture, retain and utilize the solar heat to which the interior of said housing is exposed by way of said solar glass.

12. A solar panel as in claim 6 characterized by bars providing multiple complementary recesses for each said loop applied to inhibit radial or axial movement of said loops within said housing.

13. Apparatus as in claim 6 including a second like solar panel, characterized in that said coils of said panels are interconnected in series relation by means for delivering fluid to and from said coils including a recirculation line to enable repetitive enhancement of the temperature of such fluid as is passed through said coils within said panels prior to its delivery to its intended place of use.

* * * * *

UNITED STATES PATENT AND TRADEMARK OFFICE
CERTIFICATE OF CORRECTION

PATENT NO. : 4,676,227

DATED : 06/30/87

INVENTOR(S) : Lonnie D. Walters

It is certified that error appears in the above-identified patent and that said Letters Patent is hereby corrected as shown below:

Column 3, line 57, delete "by" (second occurrence)

Column 5, line 5, delete "the bridge" which precedes "this"

line 50, amend "is" to read -- and --.

line 55, amend "form" to read -- forming --.

Column 6, line 27, amend "the" to read -- its --.

Column 7, line 3, "considerably" to read -- considerable --.

Column 8, line 19, (claim 6, line 3) "and" second occurrence, to read -- said --.

Signed and Sealed this

Twenty-second Day of December, 1987

Attest:

DONALD J. QUIGG

*Attesting Officer*    *Commissioner of Patents and Trademarks*